(12) United States Patent  (10) Patent No.: US 8,661,253 B2
Wen et al.  (45) Date of Patent: Feb. 25, 2014

(54) METHODS OF PROVIDING AN INTEGRATED AND MUTUAL AUTHENTICATION IN A COMMUNICATION NETWORK

(75) Inventors: Shaokai Wen, South Barrington, IL (US); James M. Nowakowski, Buffalo Grove, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 108 days.

(21) Appl. No.: 13/184,990

(22) Filed: Jul. 18, 2011

(65) Prior Publication Data

US 2013/0024688 A1   Jan. 24, 2013

(51) Int. Cl.
    H04L 29/06   (2006.01)
(52) U.S. Cl.
    USPC ........................................................ 713/168
(58) Field of Classification Search
    USPC .............. 713/168, 169; 380/278; 726/2, 5, 10
    See application file for complete search history.

(56) References Cited

U.S. PATENT DOCUMENTS

| 6,792,534 | B2 * | 9/2004 | Medvinsky ................... 713/171 |
| 7,243,370 | B2 * | 7/2007 | Bobde et al. .................. 726/10 |
| 2003/0005280 | A1 | 1/2003 | Bobde et al. |
| 2009/0126001 | A1 * | 5/2009 | Krantz et al. .................. 726/10 |
| 2011/0265172 | A1 * | 10/2011 | Sharma et al. ..................... 726/8 |

OTHER PUBLICATIONS

Manoj Wagle, Rohit Aradhaya: "An Out-of-Band authentication procedure for SIP; draft-wagle-sip-kerbpki-00.txt", Nov. 10, 2002, XP015005656, section 1, section 4.1-section 5.1.

PCT International Search Report and Written Opinion for Application No. PCT/US2012/046565 dated Oct. 10, 2012.
J. Franks, et al., Network Working Group, RFC 2617; HTTP Authentication: Basic and Digest Access Authentication; Jun. 1999; 38 Pages.
Jung-Shian Li, et al., A Kerberos-Based Single Sign-On System for VoIP SIP Servers and Clients With a Terminal Mobility Capability; 2010; 4 Pages.
[MS-SIPAE]: Kerberos Authentication Example, Nov. 9, 2010; 1 Page.
Rosenberg, J. et al., "SIP: Session Initiation Protocol," Network Working Group, RFC 3261, pp. 236, Jun. 2002.
Schulzrinne, H. et al., "RTP: A Transport Protocol for Real-Time Applications," Network Working Group, RFC 3550, pp. 91, Jul. 2003.

* cited by examiner

*Primary Examiner* — Ali Abyaneh
(74) *Attorney, Agent, or Firm* — Steven A. May

(57) ABSTRACT

A service ticket request is transmitted to a key distribution center in response to providing the security credential. In response to the transmitting, a session key encrypted with a TGT session key shared between a SIP client and a Kerberos authentication server, and a service ticket encrypted with a SIP service key shared between a SIP server and the Kerberos authentication server are received. The service ticket includes the session key. The session key, encrypted with the SIP session key shared between the SIP client and the Kerberos authentication server, is decrypted by the SIP client. The service ticket is transmitted to a SIP server. The SIP server decrypts the service ticket using the SIP service key shared between the SIP server and the Kerberos authentication server and stores the session key. The session key is utilized for mutual digest authentication between the SIP client and the SIP server.

20 Claims, 5 Drawing Sheets

METHODS OF PROVIDING AN INTEGRATED AND MUTUAL AUTHENTICATION IN A COMMUNICATION NETWORK

TECHNICAL FIELD

The present disclosure relates generally to communication systems and in particular to methods for providing an integrated and mutual authentication in a communication network.

BACKGROUND

Secure and efficient real-time communication with minimal latency is a critical requirement for public safety organizations and first responders. Toward that end, the Telecommunications Industry Association (TIA) adopted and standardized a suite of Land Mobile Radio (LMR) standards termed Project 25 (P25), as described for example, in the TIA 102-series documents. The P25 standard defines the operation and interfaces of P25-compliant radio systems. Additionally, through a gateway, non-compliant radio systems can also operate in a P25 network. The P25 standard also defines, in part, a standard for narrowband trunked systems.

As one example, portable radio transceivers or "walkie-talkies" are often implemented within a narrowband trunked network to quickly establish direct one-to-one and one-to-many communication links. Such radio transceivers are indispensable for law enforcement, rescue, and military personnel, and have even become commonplace across various business environments as well as for recreational activities. In particular, radio transceivers provide a near instantaneous connection between users in a talk group by utilizing push to talk (PTT) communications over a half-duplex radio transmission system, for example, over a circuit-switched network Advances in cellular packet-switched networks have resulted in the development of a broadband push to talk over cellular (PoC) application, for example, as described in PoC V 1.0.3 Enabler Package released September 2009 by Open Mobile Alliance (OMA). Specifically, a PoC network provides a half-duplex voice over internet protocol (VoIP) solution, with well-known PTT functionality. PoC is implemented on an internet protocol multimedia subsystem (IMS) platform, as described in 3GPP Technical Specification (TS) 23.228 and any subsequent revisions. Moreover, PoC employs familiar protocols for voice and control signaling, including Real-Time Transport Protocol (RTP), as described, for example, in Request for Comments (RFC) 3550 dated July 2003 by Internet Engineering Task Force (IETF) and any subsequent revisions, and Session Initiation Protocol (SIP), for example, as described in RFC 3261 published June 2002 by IETF Network Working Group and any subsequent revisions.

In order to maintain the security of radio and/or other types of communication within a communication network, a reliable authentication scheme is needed. In SIP, hypertext transfer protocol (HTTP) digest authentication, as described, for example, in RFC 2617 dated June 1999 by IETF and any subsequent revisions, is used to authenticate a SIP client to a SIP server. For HTTP digest authentication to work, both the SIP client and the SIP server have to have a shared password which is manually configured in both the SIP client and SIP server. Furthermore, for multiple SIP clients, each SIP client also needs to be manually configured. In the event of a password change, the new password needs to be manually changed in both the SIP clients and the SIP server. Additionally, HTTP digest authentication requires the SIP client to resend appropriate authentication values to the SIP server for every message sent. Thus, a use may be prompted multiple times to provide a username, password, or other security credentials in order to access SIP services. Accordingly, there is a need for a system and method for providing an integrated and mutual authentication in a communication network.

BRIEF DESCRIPTION OF THE FIGURES

The accompanying figures, where like reference numerals refer to identical or functionally similar elements throughout the separate views, together with the detailed description below, are incorporated in and form part of the specification and serve to further illustrate various embodiments of concepts that include the claimed invention, and to explain various principles and advantages of those embodiments.

Figure 1:
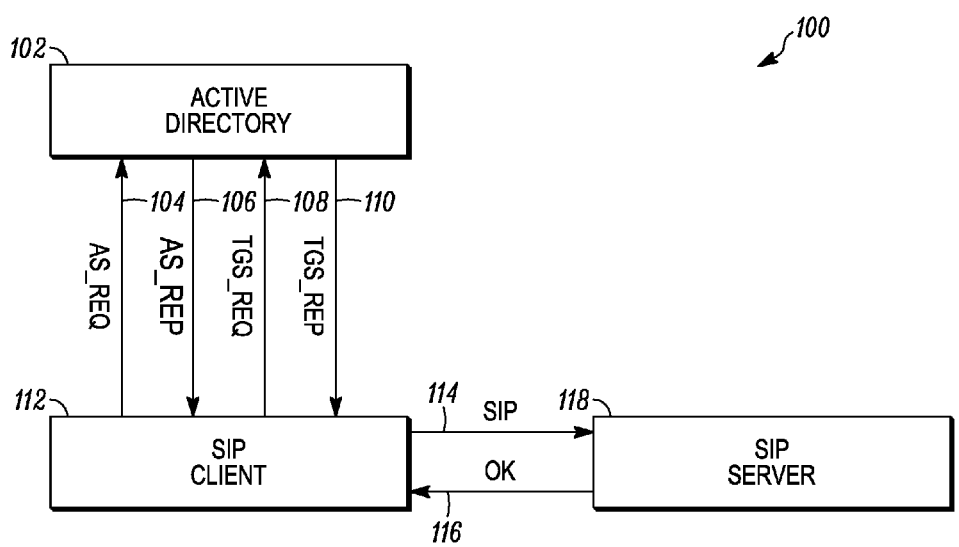
FIG. 1 illustrates a communication system in accordance with illustrative embodiments of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to the various embodiments, the present disclosure provides a system and method for providing an integrated and mutual authentication in a communication network, such as in a communication network utilizing a Kerberos-based single sign-on authentication scheme. In particular, as described herein, methods for providing an integrated and mutual authentication in a communication network include providing a security credential at a SIP client to authenticate to a key distribution center. A service ticket request is transmitted to the ticket grant server in a Kerberos authentication server in response to providing the security credential. In response to the transmitting, a session key encrypted with a Ticket Granting Ticket (TGT) session key shared between a SIP client and a Kerberos authentication server, and a service ticket encrypted with a SIP service key shared between a SIP server and the Kerberos authentication server are received. The service ticket includes the session key. The session key, encrypted with the ticket grant session key shared between the SIP client and the ticket grant server in the Kerberos authentication server, is decrypted by the SIP client. The service ticket is transmitted to a SIP server. The SIP server decrypts the service ticket using the SIP service key shared between the SIP server and the Kerberos authentication server and stores the session key. The session key is utilized for mutual digest authentication between the SIP client and the SIP server.

For the various embodiments described herein, the use of a session key, as described below, is used to prevent online directory attack. In some embodiments, the session key includes a random number. As a further prevention to directory attack, the service ticket is passed only once and it is encrypted using a password only known to the SIP server, where such password can be created as a random number. As used herein, a "session key" is used for authentication, for example, between a SIP client and a SIP server.

As used herein, a "ticket" or "Kerberos ticket" is used to describe a certificate that is issued by an authentication server. The certificate is encrypted using the authentication server key. In some embodiments, the authentication server includes a Kerberos authentication server. In other embodiments, the authentication server includes an active directory. More generally, as described herein, the term "active directory" is used to include any Kerberos authentication server. Also, as used herein, the term "validating" or "authenticating" means verification that encrypted data and/or keying material comes from a trusted source. Further, as used herein, the term "keying material" refers to anything used, for example, in the encryption and/or decryption of data or other information, such as, a public key, a private key, a symmetric key, an asymmetric key, a nonce, or a ticket, among others.

The systems and methods for providing an integrated and mutual authentication in a communication network, as described in this disclosure, are compliant with established standards and protocols, such OMA PoC, for example, as described in PoC V 1.0.3 Enabler Package released September 2009 by Open Mobile Alliance (OMA), RTP, as described, for example, in Request for Comments (RFC) 3550 dated July 2003 by Internet Engineering Task Force (IETF) and any subsequent revisions, SIP, as described in RFC 3261 published June 2002 by IETF Network Working Group and any subsequent revisions, HTTP digest authentication, as described, for example, in RFC 2617 dated June 1999 by IETF and any subsequent revisions, and Kerberos protocols. However, the embodiments of the present disclosure are not limited by these protocols.

Also, as used herein, the terms "mobile device", "client", "participant", and "user" are used interchangeably. Further, each participant engages in a communication session by way of any combination of hardware and/or software devices as discussed below. At times, embodiments of the present disclosure are described with reference to an individual user or a few users for the sake of clarity in understanding the embodiment; however, the embodiments as disclosed herein can generally be applied to any arbitrary number of users and/or groups of users, including predetermined lists of users, predetermined groups of users and/or groups of groups, and ad hoc groups. Further, the benefits and advantages as described herein are applicable to any combination of servers, networks, participants, and other hardware/software devices that are capable of supporting the embodiments disclosed below. Those skilled in the art will realize that the above recognized advantages and other advantages described herein are merely illustrative and are not meant to be a complete rendering of all of the advantages of the various embodiments.

Referring now to the figures, FIG. 1 shows a communication network 100 capable of providing an integrated and mutual authentication between a SIP client 112 and a SIP server 118. The communication network 100 provides a general depiction of a physical implementation of various aspects of the present disclosure. Specifically, in one illustrative embodiment, the communication network 100 comprises the SIP client 112 coupled to both the SIP server 118 and an active directory 102. Communication between the SIP client 112 and each of the SIP server 118 and the active directory 102 is accomplished via a wired or wireless link.

In some embodiments, the SIP client 112 includes any type of communication device such as radios, mobile phones, mobile data terminals, Personal Digital Assistants (PDAs), laptops, two-way radios, cell phones, etc. In general, components of the communication network 100 including the SIP client 112, the SIP server 118, and the active directory 102 are implemented using one or more memory devices, network interfaces, and processing devices that are operatively coupled, and which when programmed form the means for these system elements to implement their desired functionality, for example, as illustrated by reference to the methods and sequence diagrams shown in FIGS. 2-5. Moreover, each of the illustrative signals sent between the SIP client 112 and each of the active directory 102 and the SIP server 118, as indicated by arrows 104, 106, 108, 110, 114, 116, are described below with respect to methods shown in FIGS. 2-5.

The implementation of the communication links between the SIP client 112 and each of the SIP server 118 and the active directory 102 depends on whether the connection between the elements is wired or wireless. For example, the interfaces between two elements within the communication network 100 can include one or more wired interfaces such as a serial port interface (e.g. compliant with the RS-232 standard), a parallel port interface, an Ethernet interface, a USB interface, and/or a FireWire interface, and the like. Where the interfaces support wireless communications, the interfaces comprise elements including processing, modulating, and transceiver elements (e.g. modems) and modems that are operable in accordance with any one or more standard or proprietary wireless interfaces, wherein some of the functionality of the processing, modulating, and transceiver elements may be performed by means of the processing device through programmed logic such as software applications or firmware stored on the memory device of the system element or through hardware.

The processing device utilized by the elements of communication network 100 may be programmed with software or firmware logic or code for performing functionality described by reference to FIGS. 2-5; and/or the processing device may be implemented in hardware, for example, as a state machine or application specific integrated circuit (ASIC). The memory implemented by these system elements can include short-term and/or long-term storage of information needed for the functioning of the respective elements. The memory may further store software or firmware for programming the processing device with the logic or code needed to perform its functionality.

Further, communication between the SIP client 112 and each of the SIP server 118 and the active directory 102 can be over any broadband network such as an IP-based network, where the infrastructure elements within the network (not shown, e.g., IP routers, asynchronous transfer mode (ATM) switches, Multi-Protocol Label Switching (MPLS) switches, home agents, foreign agents, etc.) are IP compliant, for example based on RFC 791 (i.e. IPv4) or RFC 2460, and any subsequent versions. For example, in one illustrative implementation, communication between the SIP client 112 and each of the SIP server 118 and the active directory 102 is accomplished via a 3GPP Long Term Evolution (LTE)-compliant network containing an LTE core and Radio Access Network (RAN). In other implementations, communication between the SIP client 112 and each of the SIP server 118 and the active directory 102 is accomplished via a Worldwide Interoperability for IEEE 802.16 Microwave Access (WiMAX) core and RAN, a 3GPP2 EV-DO core and RAN, IEEE 802.11 based WiFi, digital subscriber line (DSL), an integrated service digital network (ISDN), a T-1 line, or a satellite connection, among others.

Communication between the SIP client 112 and each of the SIP server 118 and the active directory 102 can optionally be accomplished via any narrowband network, for example via a gateway, such as a P25 network that includes infrastructure elements, e.g., base stations, base station controllers, and the like that are P25-compliant. Thus, the communication network 100 operates using a narrowband protocol such as the Common Air Interface (CAI) protocol or other narrowband protocols of a type well-known in the industry.

Further, elements of the communication network 100 may be preconfigured to implement the desired functionality, for example, as shown in the methods and sequence diagrams of FIGS. 2-5. For example, the SIP client 112, is configured as a domain managed device and its users are configured as domain controlled users. The SIP client 112 users' security credentials are configured in the active directory 102, and usernames are synchronized with a configuration manager. SIP-based service is configured in the active directory 102, along with its security credential. The SIP-based service's security credential is configured in the SIP server 118, and the SIP server 118 stores the SIP-based service's security credential.

Figure 2:
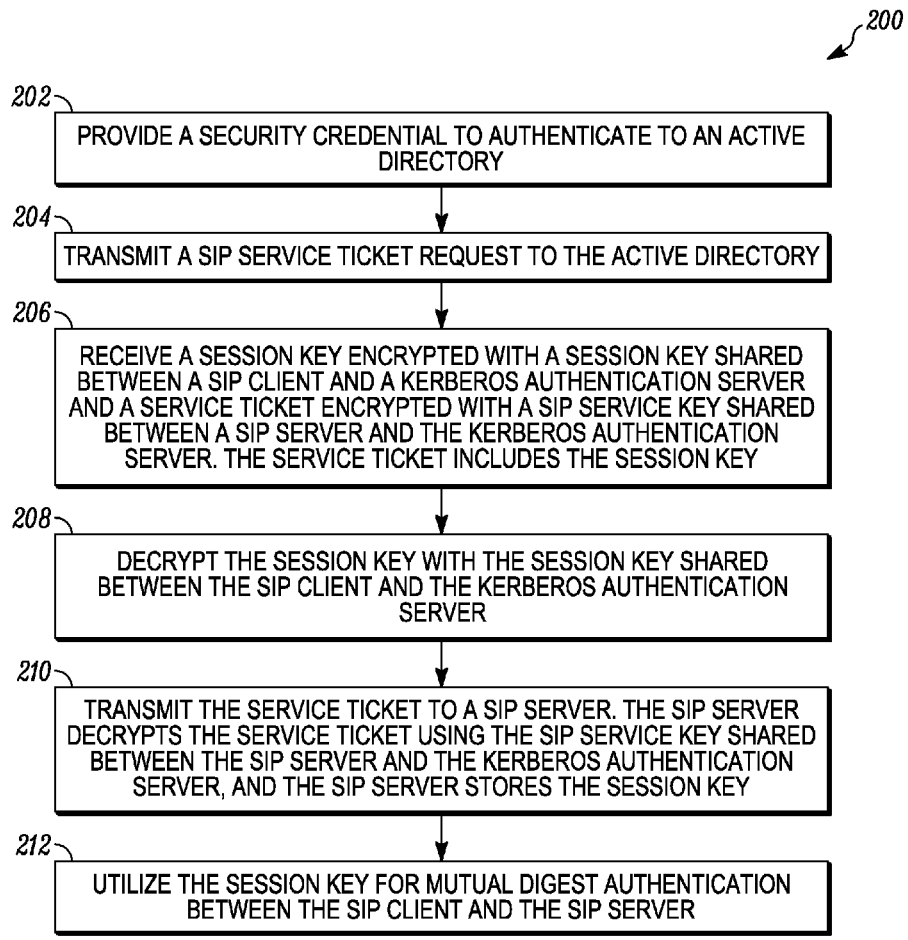
FIG. 2 is a logical flowchart showing an illustrative method for providing an integrated and mutual authentication in a communication network in accordance with some embodiments.

Turning now to the operation of the various elements of communication system 100 in accordance with the present disclosure, FIG. 2 shows a flow diagram illustrating a general method 200 for providing an integrated and mutual authentication, from the perspective of a SIP client, in accordance with embodiments of the present disclosure. The functionality of method 200 is performed by a SIP client (for example the SIP client 112). Such functionality (as well as the functionality illustrated by way of the remaining FIGS. 3-5) is performed using the combination of a processing device, memory, and interface coupled together and adapted (through software, firmware, or hardware programming, for instance) to perform such functionality.

More particularly, at 202, a SIP client 112 user's security credential is provided to the SIP client 112 to authenticate to the active directory 102. In some embodiments, the user's security credential is provided through a graphical user interface, such as a logon interface. In particular, the Kerberos-based single sign-on authentication scheme may be accomplished through integration with a user login, thus a user does not have to re-authenticate to utilize a SIP service and/or to communicate with the SIP server 118. In response to providing the user's security credential, including for example a username, a password, and a domain name, an authentication request is transmitted to the active directory 102, at 204. Specifically, the SIP client 112 calls a kernel local security authority (LSA) process. The LSA initializes a Kerberos authentication function which communicates with a Kerberos key distribution center, such as the active directory 102, by sending an authentication server request (AS_REQ) to the active directory 102 (as illustrated by an arrow 104 in FIG. 1). In some embodiments, the AS_REQ=(User$_{Client}$, Tgt$_{Service}$, IP_list, Lifetime, {Timestamp}K$_{User}$). The AS_REQ is pre-authenticated with {Timestamp}K$_{user}$ to prevent a denial of service (DoS) attack and/or a password crack. In response to the AS_REQ, the SIP client 112 receives an authentication server reply (AS_REP) from the active directory 102 (as illustrated by an arrow 106 in FIG. 1). The AS_REP includes a Ticket Granting Ticket (TGT), a TGT session key encrypted with a SIP client key shared between the SIP client and the Kerberos authentication server, and a lifetime of the session key. In some embodiments, the AS_REP={Tgt$_{Service}$, Timestamp, Lifetime, SK$_{TGS}$}K$_{User}$ {TGT}K$_{TGS}$. In various embodiments, the TGT=(User$_{Client}$, krbtgt/REALM@REALM, IP_list, Timestamp, Lifetime, SK$_{TGS}$)K$_{TGS}$.

Prior to the SIP client 112 communicating with the SIP server 118, the SIP client 112 obtains SIP service from the active directory 102 by sending a ticket granting service request (TGS_REQ) to the active directory 102 (as illustrated by an arrow 108 in FIG. 1). In some embodiments, the TGS_REQ=(PSIG$_{Service}$, Lifetime, Authenticator) {TGT}K$_{TGS}$, where the Authenticator={User$_{Client}$, Timestamp}SK$_{TGS}$. In response to the TGS_REQ, the SIP client 112 receives a ticket granting service reply (TGS_REP) from the active directory 102 (as illustrated by an arrow 110 in FIG. 1). The TGS_REP includes a service ticket, T$_{Service}$, encrypted with a SIP service key shared between the SIP server and the Kerberos authentication server, and the service ticket includes the session key SK$_{Service}$ (at 206). In some embodiments, the TGS_REP={PSIG$_{Service}$, Timestamp, Lifetime, SK$_{Service}$}SK$_{TGS}$ {T$_{Service}$}K$_{Service}$. In various embodiments, the service ticket T$_{Service}$=(User$_{Client}$, PSIG$_{Service}$, IP_list, Timestamp, Lifetime, SK$_{Service}$). The service ticket is encrypted with the SIP service key shared between the SIP server and the Kerberos authentication server. At 208, the SIP client 112 decrypts the session key with the TGT session key shared between the SIP client and the Kerberos authentication server. The service ticket is transmitted to the SIP server 118 (at 210), which decrypts the service ticket using the SIP service key shared between the SIP server and the Kerberos authentication server. The session key is used as a shared password between the SIP client 112 and the SIP server 118 using a mutual HTTP digest authentication mechanism (at 212).

Figure 3:
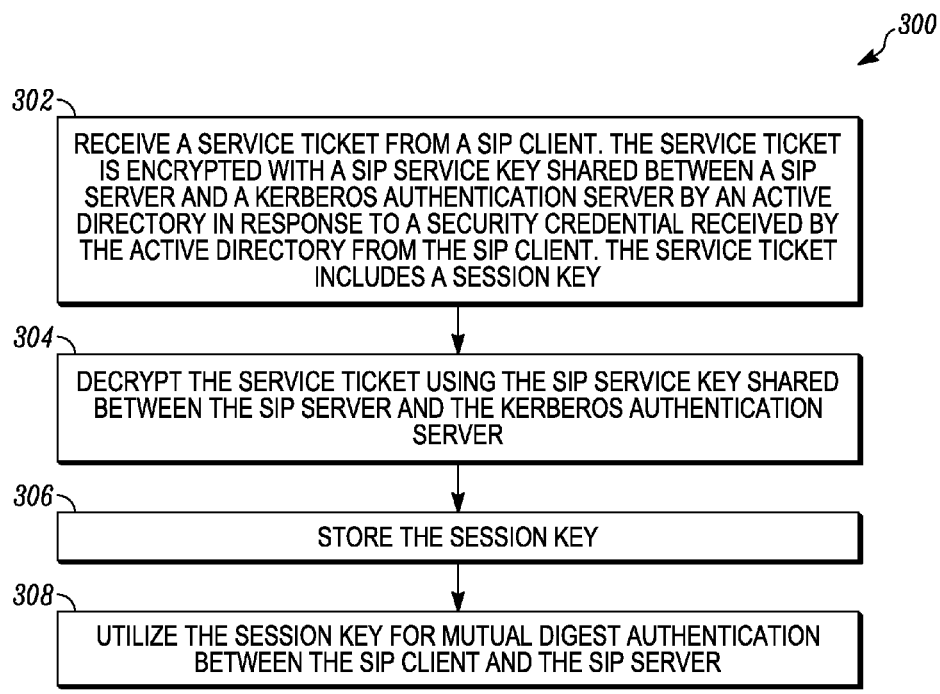
FIG. 3 is a logical flowchart showing an illustrative method for providing an integrated and mutual authentication in a communication network in accordance with alternative embodiments.

Turning now to FIG. 3, this figure shows a flow diagram illustrating a general method 300 for providing an integrated and mutual authentication, from the perspective of a SIP server, in accordance with embodiments of the present disclosure. The functionality of method 300 is performed by a SIP server (for example the SIP server 118). Such functionality is performed using the combination of a processing device, memory, and interface coupled together and adapted (through software, firmware, or hardware programming, for instance) to perform such functionality.

More particularly, at 302, the SIP server 118 receives the service ticket from the SIP client 112. The service ticket is encrypted with the SIP service key shared between the SIP server and the Kerberos authentication server by the active directory 102 in response to receiving the user's security credential. The service ticket includes the session key. At 304, the SIP server 118 decrypts the service ticket using the SIP service key shared between the SIP server and the Kerberos authentication server, and the SIP server 118 stores the session key (at 306). The session key is utilized for mutual HTTP digest authentication between the SIP client 112 and the SIP server 118 (at 308).

Figure 4:
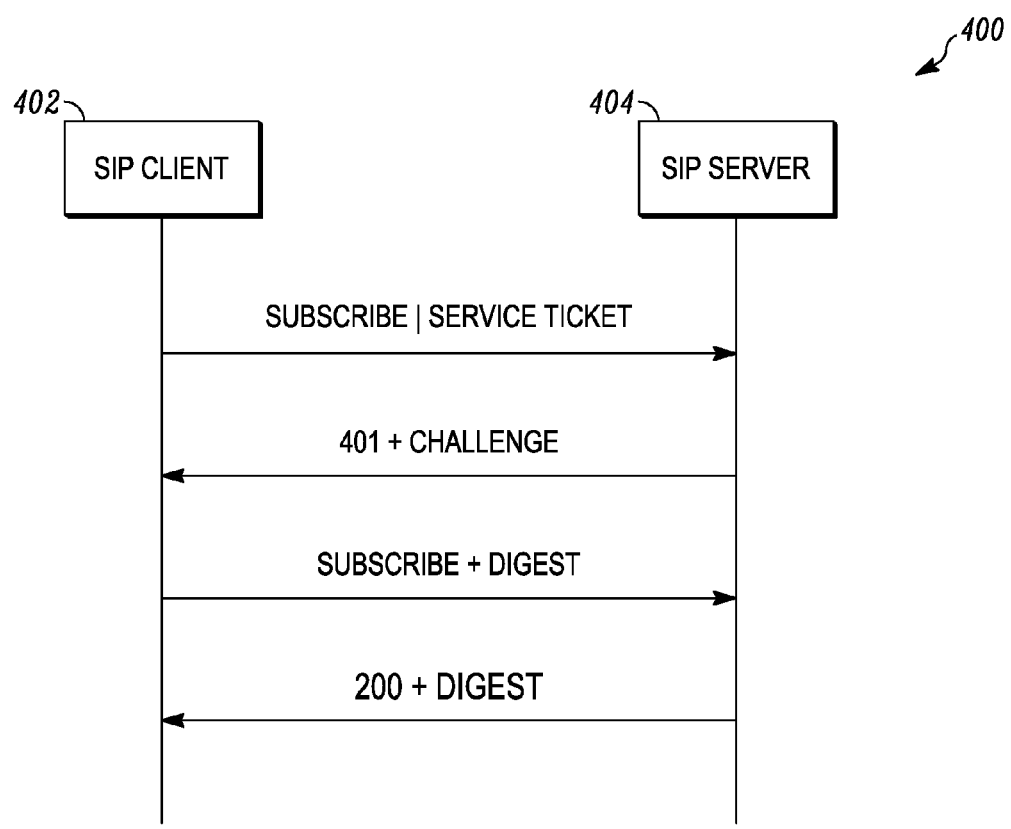
FIG. 4 illustrates a sequence diagram for SIP client registration in accordance with at least one embodiment.

FIG. 4 illustrates a sequence diagram 400 in accordance with various embodiments. In particular, FIG. 4 shows, in further detail, registration of the SIP client 402 to the SIP server 404. Upon the SIP client's 402 receipt of the SIP service session key, key lifetime, and service ticket, as described above, the SIP client 402 initiates SIP service registration with the SIP server 404. Illustratively, the SIP client 402 transmits a SUBSCRIBE message to the SIP server 404, where the SUBSCRIBE message includes the encrypted service ticket as a message payload. Initially, the SIP client 402 does not have the SIP server's 404 nonce value. As used herein, a "nonce" is a unique bit string embedded within a data stream for the purpose of authenticating the data stream and preventing replay attack. Further, as used herein, the term "unique" refers to something, such as the nonce, that is used only once and not repeated. Thus, the SUBSCRIBE message does not include an authorization header. In response to the SUBSCRIBE message, the SIP server 404 decrypts the service ticket using the SIP server 404 key. The SIP server 404 stores the session key, extracted from the encrypted service ticket. The session key is shared between the SIP client 402 and the SIP server 404. The SIP server 404 responsively sends a SIP 401 message, including a WWW-Authenticate Response header having a challenge value (a nonce value) and an authentication scheme, to the SIP client 402.

The inclusion of the service ticket in the initial message, for example the SUBSCRIBE message transmitted from the SIP client 402 to the SIP server 404, is an optimization that may be done when the SIP client 402 is expecting to use authentication prior to a challenge by the SIP server 404. In a more general situation, the initial message, for example the SUBSCRIBE message to the SIP server 404, would not include the service ticket, and the SIP server 404 would issue a SIP 401 message. The service ticket can then be added to the response to the SIP 401 message, as well as the authentication header (including the digest).

The SIP client 402 responds to the SIP 401 message by sending a SUBSCRIBE message, including an authorization request header. The authorization header includes the SIP client's 402 nonce value and a digest value. For the various embodiments described herein, the digest value is a secure hash algorithm (SHA) hash value of a username, a session key, a client nonce, a server nonce, and a message body. The nonce is derived from a local machine timestamp, and each of the SIP client 402 and the SIP server 404 store the last several nonce values, while the timestamp is increased. This method can detect a replay attack. The SIP server 404 verifies the authorization request header using the session key, a user name, a domain name, the SIP server's 404 nonce value, and the SIP client's 402 nonce value. If the authorization header is successfully verified, the SIP server 404 stores the SIP client's 402 nonce value and the SIP server 404 generates a new SIP server 404 nonce value called a next-nonce value. The SIP sever 404, using the SIP client's 402 nonce value, the SIP server's 404 nonce value, and the session key, the SIP server 404 generates a SIP 200 message, including an Authentication-Info header, and transmits the SIP 200 message to the SIP client 402. Within the SIP 200 message, the SIP server 404 also transmits the next-nonce value to the SIP client 402. The SIP client 402 utilizes the next-nonce value when the SIP client 402 initiates a new communication with the SIP server 404.

Responsive to receiving the SIP 200 message, the SIP client 402 verifies the Authentication-Info header using the SIP client's 402 nonce value, the SIP server's 404 nonce value, and the shared session key. The SIP client 402 stores the next-nonce value. If the authentication header of the SIP 200 message is successfully verified by the SIP client 402, the SIP client 402 is registered with the SIP server 404. Accordingly, both the SIP client 402 and the SIP server 404 verify the authentication header, and upon successful verification both the SIP client 402 and the SIP server 404 are mutually authenticated.

In addition, once each of the SIP client 402 and the SIP server 404 have each other's nonce value, the authorization header is included in all SIP messages transmitted to/from each of the SIP client 402 and the SIP server 404. Thus, the SIP client 402 can verify if a SIP message truly comes from the SIP server that has the service key. Likewise, only the SIP server which has the service key can decrypt the service ticket to retrieve the session key. Also, the SIP server 404 knows whether the SIP client 402 has the session key which is obtained through authentication with a domain controller. Moreover, upon registration, the SIP client 402 preemptively sends a corresponding authorization header without receipt of another challenge value from the SIP server 404. The SIP client 402 remembers the SIP server's next-nonce value and uses this value and a newly generated SIP client nonce value to build the authorization header. Thus, by maintaining a portion of the authorization header (a nonce value) at each of the SIP client 402 and the SIP server 404, an additional round of message exchange between the SIP client 402 and the SIP server 404 is eliminated, and the time needed for SIP message exchange is reduced. Additionally, the setup time for real-time audio/video exchanges, for example such as Push-to-talk conversations, is minimized.

Figure 5:
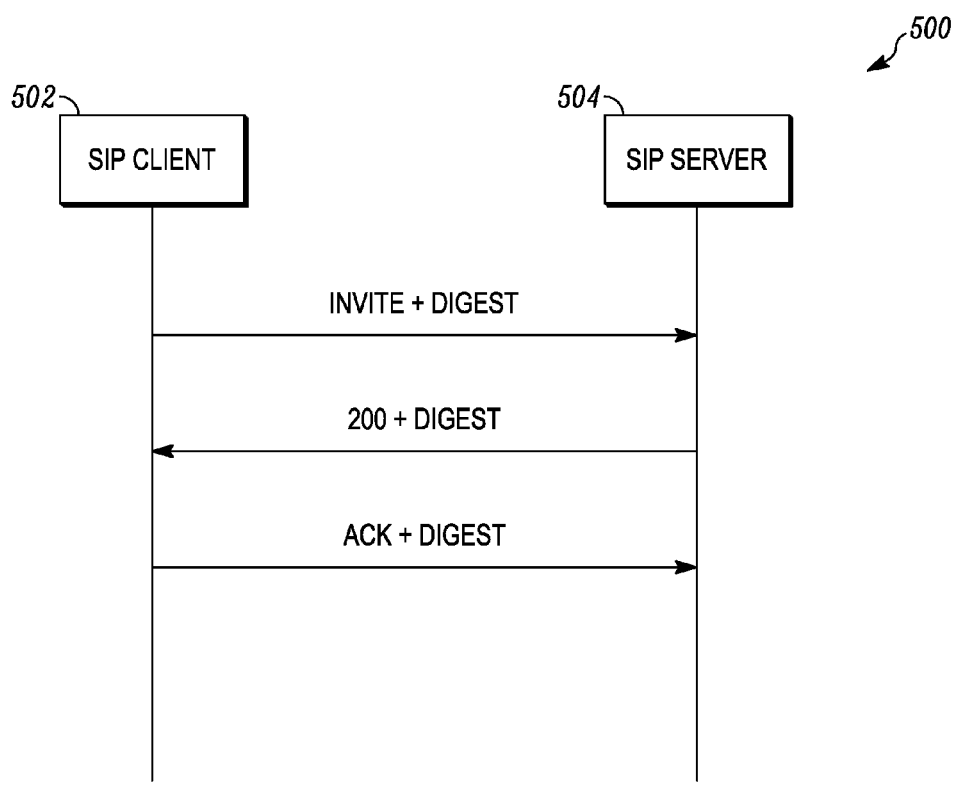
FIG. 5 illustrates a sequence diagram for creating a SIP service flow in accordance with at least one embodiment.

FIG. 5 illustrates a sequence diagram 500 in accordance with various embodiments. In particular, FIG. 5 shows a SIP client 502 service flow creation. Upon successful registration of the SIP client 502 to the SIP server 504, the SIP client has the SIP server's 504 next-nonce value stored, as described above. The SIP client 502 generates an INVITE message, including an authorization header, where the authorization header is created using the SIP server's 504 next-nonce value, a new SIP client 502 nonce value, and the service session key. In response to the INVITE message, the SIP server 504 verifies the INVITE message, including the authorization header. The SIP server 504 generates another new nonce value, which is a new next-nonce value. Upon successful verification of the INVITE message by the SIP server 504, the SIP server 504 transmits a SIP 200 message, including an Authentication-Info header, where the Authentication-Info header is created using the new SIP client 502 nonce value, the SIP server's 504 next-nonce value, and the shared session service key. The SIP server 504 also transmits the new next-nonce value to the SIP client 502 to use for a subsequent SIP client 502 initiated SIP conversation. Responsively, the SIP client 502 verifies the SIP 200 message, including the Authentication-Info header, using the new SIP client 502 nonce value, the SIP server's 504 next-nonce value, and the shared session key. If the SIP 200 message is successfully verified, the SIP client 502 transmits an SIP acknowledge (ACK) message to the SIP server 504, where the SIP ACK message includes an authorization header created using the same SIP server 504 and SIP client 502 nonce values that were used in the INVITE message. The SIP client 502 also stores the SIP server's 504 new next-nonce value for use when the SIP client 502 initiates a new communication with the SIP server 504. In response to receiving the SIP ACK message, the SIP server 504 confirms that the SIP client 502 service flow is created.

In the foregoing specification, specific embodiments have been described. However, one of ordinary skill in the art appreciates that various modifications and changes can be made without departing from the scope of the invention as set forth in the claims below. For example, in the sequence diagrams illustrated in FIGS. 4-5, the SIP procedure is initiated by the SIP client. However, once the SIP client and the SIP server each have a session key and nonce to use, the SIP server can equally initiate the SIP procedure with an authorization header. Furthermore, throughout the specification and in the listing of claims, specific SIP messages (SUBSCRIBE, INVITE, ACK, etc.) have been used for purposes of illustration only. However, those of ordinary skill in the art will realize that the various embodiments as described herein can be advantageously implemented within any SIP message. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed. Also, the sequence of steps in a flow diagram or elements in the claims, even when preceded by a letter does not imply or require that sequence.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more ASICs, in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g. comprising a processor) to perform a method as described and claimed herein. Examples of such computer-readable storage mediums include, but are not limited to, a hard disk, a CD-ROM, an optical storage device, a magnetic storage device, a Read Only Memory (ROM), a Programmable Read Only Memory (PROM), an Erasable Programmable Read Only Memory (EPROM), an Electrically Erasable Programmable Read Only Memory (EEPROM) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for providing an integrated and mutual authentication in a communication network, the method comprising:
   at a Session Initiation Protocol (SIP) client:
   transmitting a service ticket request to a key distribution center in response to a provision of a user's security credentials to authenticate to the key distribution center;
   responsive to the transmitting, receiving a session key encrypted with a Ticket Granting Ticket (TGT) session key shared between a SIP client and a Kerberos authentication server, and receiving a service ticket encrypted with a SIP service key shared between a SIP server and the Kerberos authentication server, wherein the service ticket includes the session key;
   decrypting the session key encrypted with the TGT session key shared between the SIP client and the Kerberos authentication server;
   transmitting the service ticket to the SIP server;
   utilizing the session key for mutual digest authentication with the SIP server, upon the service ticket being decrypted by the SIP server using the SIP service key shared between the SIP server and the Kerberos authentication server,
   conveying an authorization header, comprising a challenge value, to the SIP server;

in response to conveying the authorization header, receiving a responsive authorization header, comprising a new challenge value, from the SIP server;
storing a portion of the received authorization header; and
pre-emptively sending a new authorization header, based on the stored portion of the received authorization header, to the SIP server without first receiving another new challenge value from the SIP server.

2. The method of claim 1 further comprising:
utilizing the session key to calculate a digest authentication header, wherein the digest authentication header is included in each message transmitted between the SIP client and the SIP server.

3. The method of claim 2 further comprising, upon registration with the SIP server, preemptively transmitting the digest authorization header to the SIP server prior to receipt of a challenge from the SIP server.

4. The method of claim 1 wherein providing the security credential to authenticate to the key distribution center further includes authenticating to an active directory.

5. The method of claim 1 wherein transmitting the service ticket to the SIP server further includes transmitting a subscribe message to the SIP server, wherein the subscribe message includes the service ticket.

6. The method of claim 1 wherein conveying an authorization header to the SIP server comprises receiving a challenge from the SIP server and, in response, conveying the authorization header to the SIP server.

7. The method of claim 6 wherein the receiving the challenge from the SIP server further includes receiving a SIP 401 message from the SIP server, wherein the SIP 401 message includes a digest authentication header.

8. The method of claim 6 wherein conveying the authorization header comprises transmitting a subscribe message to the SIP server, wherein the subscribe message includes a digest authorization header, and wherein the digest authorization header includes a hash value derived in part from a SIP client-generated nonce value.

9. The method of claim 1 wherein receiving the responsive authorization header comprises receiving a SIP 200 message from the SIP server, wherein the SIP 200 message includes a digest Authentication-Info header, and wherein the digest authorization header includes a hash value derived in part from a SIP server-generated next-nonce value.

10. The method of claim 9 wherein storing a portion of the received authorization header comprises:
responsive to the receiving the SIP 200 message from the SIP server, verifying the digest Authentication-Info header; and
storing the SIP server-generated next-nonce value.

11. The method of claim 9 wherein sending a new authorization header comprises transmitting an invite message to the SIP server, wherein the invite message includes the digest authorization header, and wherein the digest authorization header includes the hash value derived in part from a SIP client-generated nonce value, the SIP server-generated next-nonce value, and the session key.

12. The method of claim 11 further comprising, responsive to transmitting the invite message, receiving the SIP 200 message from the SIP server, wherein the SIP 200 message includes the digest Authentication-Info header, and wherein the digest Authentication-Info header includes the hash value derived in part from the SIP client-generated nonce value, the SIP server-generated nonce value, and the session key, and wherein the SIP 200 message passes the SIP server-generated next-nonce value to the SIP client.

13. The method of claim 12 further comprising:
responsive to receiving the SIP 200 message from the SIP server, verifying the digest Authentication-Info header; and
transmitting an acknowledgement (ACK) message to the SIP server, wherein the ACK message includes the digest authorization header, and wherein the digest authorization header of the ACK message includes the hash value derived in part from the same SIP client-generated and SIP server-generated nonce values that are used to derive the hash value included in the digest authorization header of the invite message.

14. A method for providing an integrated and mutual authentication in a communication network, the method comprising:
at a SIP server:
receiving a service ticket from a SIP client, wherein the service ticket is encrypted with a SIP service key shared between the SIP server and a Kerberos authentication server by a key distribution center in response to a security credential received by the key distribution center from the SIP client, and wherein the service ticket includes a session key;
decrypting the service ticket using the SIP service key shared between the SIP server and the Kerberos authentication server;
storing the session key;
utilizing the session key for mutual digest authentication between the SIP client and the SIP server;
receiving an authorization header, comprising a challenge value, from the SIP client;
storing the challenge value;
conveying a responsive authorization header, comprising a new challenge value, to the SIP client; and
receiving a new authorization header, based on a portion of the conveyed authorization header, from the SIP client without first conveying another new challenge value to the SIP client.

15. The method of claim 14 further comprising transmitting a SIP 401 message to the SIP client, wherein the SIP 401 message includes a digest authentication header.

16. The method of claim 14 wherein receiving an authorization header, comprising a challenge value, from the SIP client comprises receiving a subscribe message from the SIP client, wherein the subscribe message includes a digest authorization header that includes a hash value derived in part from a SIP client-generated nonce value.

17. The method of claim 16 further comprising responsive to receiving the subscribe message from the SIP client, verifying the digest authorization header included within the subscribe message.

18. The method of claim 16 further comprising:
generating a SIP server-generated next-nonce value; and
wherein storing the challenge value comprises storing the SIP client-generated nonce value and wherein conveying a responsive authorization header comprises transmitting a SIP 200 message to the SIP client, wherein the SIP 200 message includes the digest Authentication-Info header, and wherein the digest authorization header includes the hash value derived in part from a SIP client-generated nonce value, the SIP server-generated nonce value, and the session key, and wherein the SIP 200 message passes the SIP server-generated next-nonce value to the SIP client.

19. The method of claim 14 further comprising:
receiving an invite message from the SIP client, wherein the invite message includes a digest authorization header;
responsive to receiving the invite message, verifying the digest authorization header included within the invite message; and
generating a SIP server-generated next-nonce value.

20. The method of claim 19 further comprising:
transmitting a SIP 200 message to the SIP client, wherein the SIP 200 message includes the digest Authentication-Info header, and wherein the digest authorization header includes the hash value derived in part from a SIP client-generated nonce value, the SIP server-generated nonce value, and the session key, and wherein the SIP 200 message passes the SIP server-generated next-nonce value to the SIP client; and
receiving an acknowledgement (ACK) message from the SIP client.

* * * * *